April 24, 1928.   1,667,435

R. OPPENHEIM

LEAD ACCUMULATOR

Filed April 18, 1925   2 Sheets-Sheet 1

Inventor
R. OPPENHEIM
Marks & Clerk
Attys

April 24, 1928.

R. OPPENHEIM

LEAD ACCUMULATOR

Filed April 18, 1925

Inventor
R. OPPENHEIM
Marks + Clark
attys

Patented Apr. 24, 1928.

1,667,435

UNITED STATES PATENT OFFICE.

RENÉ OPPENHEIM, OF LEVALLOIS-PERRET, FRANCE, ASSIGNOR TO SOCIÉTÉ ANONYME LE CARBONE, OF LEVALLOIS-PERRET, FRANCE.

LEAD ACCUMULATOR.

Application filed April 18, 1925, Serial No. 24,235, and in France June 14, 1924.

The present invention has for object an improvement in the manufacture of lead accumulators and having as an object to reduce their weight and increase their mass capacity.

This improvement consists, substantially, in the use, as an active material in the accumulator, of a mixture composed of lead, or of a lead oxide, in the form of powder, and of a porous conducting body in granular form, of small density, having a high power of absorption for gases and rendered, by suitable treatment, impervious to liquids whilst remaining permeable to gases, so as to preserve, in the course of the operation of the accumulator, its power of absorption for gases.

By the present invention the active material proper (lead or lead oxide in powder form) is intermixed with a material taking an active part itself in the operation of the accumulator.

In fact, the particles of the porous impervious body, mixed with the active material, absorb, upon charging the accumulator, oxygen and hydrogen which have not been fixed, by the lead and, by the lead oxide, and restitute these gases upon discharge.

Moreover, owing to the absorption of oxygen by the porous impervious body mixed with the active material, the action of sulphuric acid on the lead is slower. As a result the sulphatation, that is, conversion of lead into lead sulphate is inhibited. The life of the accumulator is thus increased.

On the other hand, the said porous body containing lead or lead oxide intimately mixed, increases the surface of contact of the latter with the electrolyte.

In an accumulator constructed in accordance with the present invention, the porous conducting impervious grains or particles, mixed with lead or with lead oxide therefore have a double function:

1. They subdivide the active material proper, that is, the lead or lead oxide and thus increase its effective surface area.

2. They act to prevent sulphatation of the lead and to absorb oxygen and hydrogen liberated during charging.

Owing to the lightness of these porous conducting impervious grains and to the state of subdivision of the active material, the mass capacity of the accumulator is considerably increased.

By way of example, the product in accordance with the present invention and adapted to be used as an active material in a lead accumulator, may have the following composition:

1. Powder of very porous charcoal, in large grains of about 0 m/m 5 to 1 m/m, 20%.

2. Powder of very porous charcoal in extremely fine grains passing through a screen having 150 to 200 meshes per linear inch, 20%.

3. Pulverized lead or lead in powder form, 60%.

Instead of lead, oxides of lead can also be used, particularly peroxide of lead or litharge.

The granular or powdered porous charcoal having grain sizes as in the above example, may be rendered impervious to liquids (that is unwetted by liquids) yet permeable to gases in the following manner.

The granular or powdered absorbent material is exposed for a sufficient length of time in a vessel containing vapours of fatty bodies, or of vapours of hydrocarbons, or of vapours of paraffin; or the absorbent material is moistened with a solution of paraffin in benzine and the benzine is subsequently evaporated. These grains can also be mixed with a solution of rubber in gasolene and the gasolene subsequently evaporated.

The absorbent material thus rendered impermeable to liquids is mixed with pulverized lead or with a lead oxide in powder form, for instance in the following proportion:

Pulverized lead or lead oxide in powder form, 80%.

Treated porous grains, 20%.

The mixture is moistened with a solution of sulphuric acid, of 10% strength for instance.

The invention is moreover characterized by the application of the active material as above defined to various modes of construction of accumulators.

Fig. 4 is a vertical cross section of the accumulator; Fig. 5 illustrates in elevation one of the plates of the latter.

Figure 6:
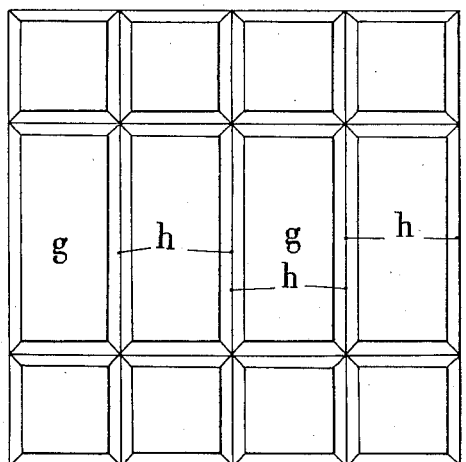
Figure 7:
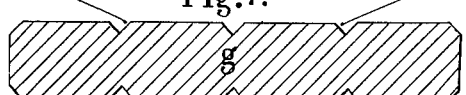
Figure 8:
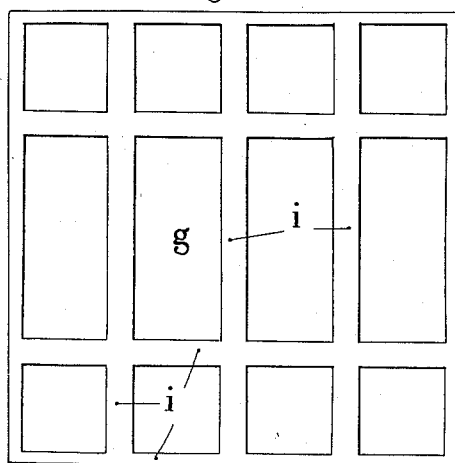
Figure 9:
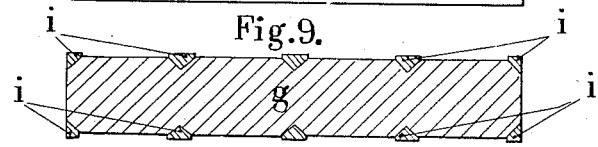

Figs. 6 to 9 illustrate a mode of construction of accumulator plates utilizing the active material above defined and on which is cast a lead grid after agglomeration of the plate; Figs. 6 and 7 illustrate in elevation and cross section the agglomerated plate before casting of the lead grid; Figs. 8 and 9 illustrate in elevation and cross section the agglomerated plate after casting of the lead grid.

Figure 1:
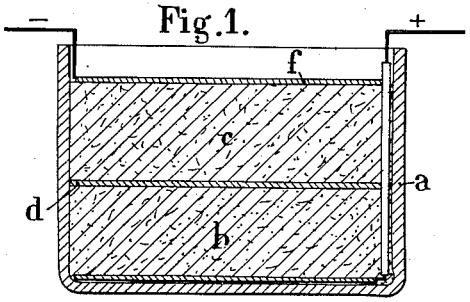
Figs. 1 to 3 illustrate in vertical section three different modes of applications.

In the type of accumulator illustrated in Fig. 1, the vessel or jar $a$, made of glass, ebonite or other insulating material, is divided in two compartments $b$, $c$ by a porous horizontal partition $d$, made of pipe-clay, wood fibre or any other material used as diaphragm in accumulators. The positive electrode $e$ and negative electrode $f$, each constituted by a lead strip or blade, are horizontally arranged and respectively placed in the two compartments $b$, $c$. These latter are filled with the active material the composition of which has been given above.

On the whole thus constituted is poured sulphuric acid of 10 or 15° B.

Figure 2:
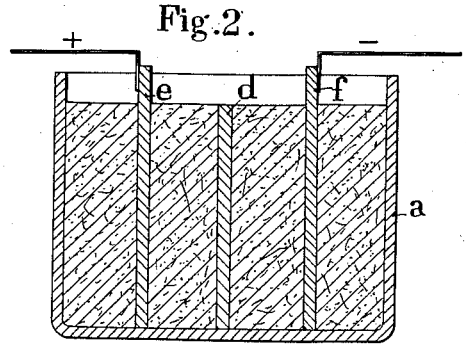

In the form of construction illustrated in Fig. 2, the porous partition $d$ is vertical and the two electrodes $e$, $f$, constituted by lead strips or rods, are vertically arranged.

Figure 3:
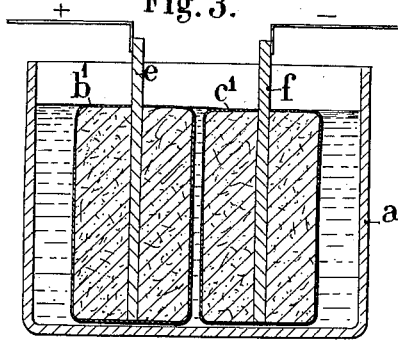

Fig. 3 shows another method of construction in which the two anodic and cathodic compartments are constituted by two parchment bladders $b^1$, $c^1$ extending into the vessel $a$; these bladders respectively contain the two electrodes $e$, $f$ and are each filled with the active material above defined, moistened with a solution of sulphuric acid of about 15° B. The vessel $a$ is, moreover, filled with a solution of sulphuric acid also of 15° B.

Figure 4:
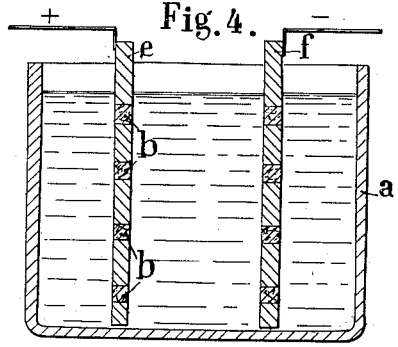
Figs. 4 and 5 illustrate another mode of application.
Figure 5:
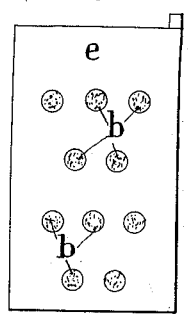

Figs. 4 and 5 illustrate a modification in which use is made of two plates made of retort carbon perforated with holes or of ordinary lead grids. $e$ and $f$ designate two plates thus constituted, perforated, for instance, with circular holes $b$ and $c$. In these holes, are compressed with a spatula, or otherwise, small slugs formed by the active mixture above described, moistened in the proportion of 10% of the weight of dry mixture with a solution of sulphuric acid of 10% strength. These two plates forming the anode and cathode are immersed in a solution of sulphuric acid of about 10% strength contained in a vessel which is not attacked by the acid.

An accumulator plate can also be constructed in accordance with the present invention by operating in the following manner:

An intimate mixture is formed by means of the following ingredients:

2 kgs. of litharge in powder form.
0 kg. 200 of charcoal in grains of 0 m/m. 5 to 1 m/m.
0 kg. 200 of charcoal in the form of an extremely fine powder.
0 kg. 200 of melted glucose.

This mixture is firmly compressed in a mould so constituted that the agglomerate thus obtained is in the form of a plate $g$ presenting on its surface, in the vertical direction and in the horizontal direction (Figs. 6 and 7), grooves $h$.

The plate thus obtained is heated to a temperature of about 500° C. so as to effect the coking of the glucose.

Then the plate being placed in a foundry mould, of suitable shape, molten lead is cast in the grooves $h$ of this plate. When cooling, this lead constitutes a grid $i$ in intimate contact through all its points with the plate $g$ (Figs. 8 and 9).

Instead of the mixture indicated above, the following mixture can also be used:

2 kgs. of litharge in powder form.
0 kg. 400 of charcoal in grains of 0 m/m. 5 to 1 m/m.
0 kg. 200 of melted glucose.

As previously stated, this mixture is moulded in the shape of a plate, and the plate obtained is heated to a temperature of about 400° C., but, in this case, before casting of the lead, the plate is impermeabilized and, for that purpose, is exposed, as above mentioned, to the action of vapours of hydrocarbons or of paraffin.

The active material can be simultaneously agglomerated and impermeabilized by using as binding means a solution of rubber; in this case, one operates in the following manner:

A mixture is prepared by means of 0 kg. 400 of charcoal, in grains of 0 m/m. 5 to 1 m/m. and of 0 kg. 200 of a solution of rubber containing about 0 kg. 100 of rubber per litre of gasolene.

On the other hand, 2 kgs. of litharge or of red lead in powder form are moistened with 200 cubic centimetres of a solution of sulphuric acid of approximately 10% strength.

The whole is then mixed together.

The paste thus obtained is compressed into the desired shape, the plates thus formed are finally placed in a stove and heated for instance to a temperature of 100° C. during the time necessary for completely evaporating the gasolene and water.

Strong resistant and resilient, accumulator plates are thus obtained and from this fact these plates do not risk being disintegrated at high rates of charging and discharging.

Moreover, the rubber thus incorporated has the property of absorbing for its own part the gases of the reaction upon charging and of restituting them upon discharge.

It is to be understood that the proportions given above are indicated by way of examples only and that they can be modified.

The modes of execution above described are given by way of example only; the shape, dimensions, details, of construction of the constituent elements of the accumulator and the number of anodic and cathodic compartments can be varied according to the applications.

Claims:—

1. An electrode element for lead accumulators comprising an intimate mixture of powdered electrode material and a finely divided porous material rendered impermeable to liquids but having a high absorption power for gases.

2. An electrode element for lead accumulators comprising an intimate mixture of powdered electrode material and a finely divided absorbent charcoal rendered impermeable to liquids but having a high absorption power for gases.

3. An electrode element for lead accumulators comprising electrode material intimately mixed with absorbent charcoal of large grain size and finely powdered absorbent charcoal, said absorbent charcoal being rendered impermeable to liquids but having high absorption power for gases.

4. An electrode element for lead accumulators comprising lead electrode material intimately mixed with absorbent charcoal of large grain size and finely powdered absorbent charcoal, said absorbent charcoal being rendered impermeable to liquids but having high absorption power for gases.

5. An electrode element for lead accumulators comprising electrode material intimately mixed with absorbent charcoal of large grain size and finely powdered absorbent charcoal, said absorbent charcoal having a film of rubber thereon to render it impermeable to liquids but having high absorption power for gases.

6. The process of preparing an electrode element for lead accumulators which comprises treating absorbent charcoal to render the same impermeable to liquids but permeable to gases and thereafter intimately mixing the so treated charcoal with lead electrode material in finely divided form.

7. The process of preparing an electrode material for lead accumulators which comprises treating absorbent charcoal with a rubber solution to render said charcoal impermeable to liquids but permeable to gases and thereafter intimately mixing the so treated charcoal with finely divided lead electrode material.

The foregoing specification of my "lead accumulator" signed by me this 2nd day of April, 1925.

RENÉ OPPENHEIM.